Patented Oct. 24, 1944

2,360,990

UNITED STATES PATENT OFFICE 2,360,990

RUBBER COMPOUNDING, ETC.

Edward Alfred Van Valkenburgh, New York, N. Y., assignor of three-fourths to Amino Products Corporation, a corporation of New York No Drawing. Application November 26, 1938, Serial No. 242,567

19 Claims. (Cl. 260—795)

This invention relates to improvements in rubber compounding, etc.; and includes improvements in the compounding and vulcanizing of rubber, and the products resulting therefrom, as well as new compositions of matter which are particularly advantageous for use in rubber compounding and other purposes, and the production of such new compositions.

In the compounding and vulcanization of rubber it is customary to add to and compound with the rubber, in addition to the vulcanizing agent, various compounding ingredients such as softeners or plasticizers, accelerators, anti-oxidants or age resisters, etc., prior to vulcanization, so that the compounding and vulcanization will be modified and improved thereby. Separate compounding ingredients are commonly added for this purpose, for example, hydrocarbon softeners or plasticizing agents to facilitate the incorporation of dry powdered fillers, and to obviate the necessity of severe mechanical mastication of the vulcanized rubber, organic accelerators, common fatty acids as activators of vulcanization, and anti-oxidants.

The present invention provides an improved method of rubber compounding, in which a composite compounding composition is employed which enables improved results to be obtained with a single composition and which obviates in whole or in part the need of adding separate compounding ingredients as plasticizers, accelerators, age resisters, etc. The improved compounding process of the present invention involves adding to the rubber, either natural or synthetic, or aqueous dispersions or emulsions of the same, a composite composition resulting from the treatment of controlled oxidation reaction mixtures of petroleum hydrocarbons with amino substances to give composite amino reaction mixtures which serve to plasticize the rubber before vulcanization, to accelerate the vulcanization, to give the vulcanized rubber improved physical properties, and to increase the resistance of the rubber to mechanical fatigue and to ageing deterioration. The utilization of the new composite reaction mixtures enables improved results to be obtained in the compounding of the rubber before vulcanization, as well as during vulcanization, and enables improved vulcanized rubber products to be obtained.

It has heretofore been proposed to add oxidation reaction mixtures of petroleum hydrocarbons to vulcanizable rubber compositions, but the use of such reaction mixtures tends to retard the rate of vulcanization, to prevent complete and satisfactory vulcanization and to yield vulcanized rubber products of low modulus and of generally inferior quality.

As distinguished from the use of such oxidation reaction mixtures, the utilization of the new composite amino reaction mixtures enables these objections and disadvantages to be largely overcome or minimized, and improved results to be obtained, such as those above referred to and hereinafter more fully set forth.

The new compositions, which are particularly valuable for use in rubber compounding, but which are also useful for various other purposes, are composite amino reaction mixtures, obtainable by treating controlled oxidation reaction mixtures of petroleum hydrocarbons with amino substances, i. e., inorganic or organic amines or ammonia or both an amine or amines and ammonia.

When petroleum hydrocarbons or mixtures thereof are subjected to oxidation under controlled conditions they yield oxidation reaction mixtures containing substantial amounts of oxygen-containing substances, such as alcohols, phenols, esters, lactones, aldehydes, ketones, mixed carboxylic acids, including simple carboxylic acids of low and high molecular weight, oxyacids and hydroxy-acids, and other oxygen-containing substances, etc., derived from straight or branched chain aliphatic hydrocarbons or from cyclic hydrocarbons, as well as unchanged and changed hydrocarbons, etc. Petroleum hydrocarbons vary considerably in their composition, depending upon the source of the crude petroleum, but in general petroleum hydrocarbons contain principally aliphatic or paraffin hydrocarbons or in some cases cyclic hydrocarbons or naphthenes, or both aliphatic and cyclic hydrocarbons in varying proportions.

In producing the controlled oxidation reaction mixtures to be subsequently converted into amino reaction mixtures, different hydrocarbon fractions and products can be used, including those of semi-solid or solid consistency such as paraffin, wax, etc., as well as liquid hydrocarbons, such as various higher boiling fractions. Various methods of oxidizing such petroleum hydrocarbons under regulated conditions to produce controlled oxidation reaction mixtures are known, and it is also known that such reaction mixtures contain various oxidation products such as those above mentioned.

It has been proposed to separate such reaction mixtures into individual fractions, for example, to separate the fatty acids from the other oxidation products by neutralization with alkali to form soaps, with separation of the aqueous soap from the other constituents, and with reconversion of the soaps into free acids in order to obtain a separate fatty acid product.

Such separation is not required in producing the new amino reaction mixture, but the composite crude oxidation product containing fatty acids, aldehydes, ketones, etc., is advantageously directly reacted with the amino compound, or mixture of amino compounds, to give a composite amino reaction mixture which contains the products of reaction of the ammonia or amine or mixture thereof with the various reactive oxidation constituents of the oxidation product.

When a composite oxidation reaction mixture is caused to react with ammonia or with amines there is formed a composite reaction mixture containing, for example, reaction products of the amino compound with fatty acids as well as reaction products of the amino compounds with aldehydes, ketones, etc., to form a composite resulting amino reaction mixture containing a variety of amino reaction products which give a valuable composite reaction product, particularly valuable for use in rubber compounding, as well as for other purposes. Such composite amino reaction mixture enables a positive acceleration of the rate of vulcanization to be obtained, and enables vulcanized rubber products of high modulus and improved quality to be produced which have valuable properties in resistance to mechanical fatigue and to ageing deterioration on exposure to light, heat and air. Said composite amino reaction mixtures also have valuable plasticizing properties and serve as valuable plasticizing agents for vulcanizable rubber, giving an efficient softening effect without causing excessive tackiness. Because of the combined valuable properties of the new amino reaction mixtures they enable the separate addition of plasticizers, activators of vulcanization, and anti-oxidants, as individual ingredients, to be obviated inasmuch as the composite amino reaction mixtures embody in themselves valuable properties as plasticizers, activators, accelerators and anti-oxidants; or where separate ingredients are added, they may be added in materially reduced amounts. Moreover, the use of the new composite amino reaction mixture presents the combined ingredients in the form of a single composition, readily compoundable with rubber by a single compounding operation, and a material moreover which is highly compatible with rubber and enables the other compounding ingredients, such as pigments, powders, etc., to be uniformly and effectively dispersed throughout the rubber matrix.

The amino substances which are used for reacting with the controlled petroleum oxidation mixture, in producing the new composite amino reaction mixtures, include ammonia, anhydrous or aqueous, and organic amines both aliphatic and aromatic, and including both mono amines and poly amines as well as primary, secondary and tertiary amines, or mixed aliphatic and aromatic amines, or mixed primary, secondary and tertiary amines. Instead of using a single amine or ammonia, mixtures of two or more thereof can be used, ether by adding the mixture simultaneously, or by adding separate amino compounds successively. Among the amines which may thus be used, for example, are included simple primary, aliphatic and aromatic amines, or poly amines, etc., such as alkyl amines or diamines, aromatic amines or diamines, for example, paraphenylene diamine, guanidine, urea, triethylene tetramine, ammonium carbamate, etc. Amino derivatives formed by reacting the composite petroleum oxidation reaction mixtures with polyamino substances such as paraphenylene diamine, guanidine or urea are particularly advantageous. Addition derivatives formed by primary amines appear to be more efficient activators than those formed by secondary or tertiary amines. Neutralization or addition reaction mixtures formed by aqueous ammonia or by the relatively strong basic aliphatic amines are more efficient activators of rubber vulcanization in general than those formed by aromatic amines. On the other hand the condensation derivatives formed by aromatic amines appear in general to be more efficient anti-oxidants against the ageing deterioration of rubber than those formed by aliphatic amines or ammonia. Condensation derivatives of aromatic amines with a conjugated ring structure, such as alpha naphthyl amine are in general more efficient anti-oxidants than products produced by reaction of simple ring amines. Substituted amines may be used provided the substituted amines contain no substituent groups which will inhibit or retard the amino neutralization addition and condensation reactions with the oxygenated substances present in the controlled oxidation reaction mixtures. For example, guanidine, urea and ammonium carbamate can be used in the preparation of the composite amino reaction mixtures.

Furthermore, it is not necessary to use purified individual amino substances or mixtures in producing the new composite amino reaction mixtures. Highly satisfactory amino reaction mixtures for rubber compounding and for various other industrial applications can be obtained by treating the controlled oxidation reaction mixtures with industrial by-product amino mixtures, such as the residual urea-ammonia liquor obtained as a by-product in the catalytic synthesis of urea. Such a residual liquor may, for example, contain approximately 43.3% urea, 15.5% ammonium carbamate, 22.5% ammonia and 18.7% water.

In carrying out the amino treatment of the controlled oxidation reaction mixture there is added one or more organic amines, or ammonia, or mixtures thereof in amount which is advantageously at least equivalent to or somewhat in excess of the amino-reactive oxygenated substances present in the oxidation reaction mixture. Such amino-reactive oxygenated substances include carboxylic acids, aldehydes and ketones.

In the case of each different controlled oxidation reaction mixture employed it is desirable to determine the amount of amino-reactive oxygenated substances present, inasmuch as the percentages thereof may vary considerably, depending upon the composition of the original mixture of petroleum hydrocarbon subjected to oxidation, upon the reaction conditions of the controlled oxidation process, and upon the extent to which oxidation has been continued. The percent of carboxylic acids may be determined by direct titration. The total amount of amino-reactive oxygenated substances may be determined by boiling, under refluxing conditions, the oxidation reaction mixture with an excess of a relatively non-volatile amine, such as aniline. To increase the accuracy of this determination it is desirable to add a solvent, such as toluene, to insure complete miscibility, and also to carry out the refluxing operation in a still so constructed that the water of reaction may be readily separated. The heating is continued until no more water is obtained, when the solvent is removed, and the reaction mixture refluxed and agitated, e. g., for about twenty-four hours, after which the excess of amine is removed by distillation under reduced pressure and the increased weight of the residue can be used to calculate the weight of amine equivalent to the total amount of amino-reactive oxygenated substances present in the controlled oxidation reaction mixture. Inasmuch as the refluxing operation thus described may have decomposed certain unstable amino derivatives, it is desirable to make some allowance therefor, e. g., to take as the "equivalent weight" a value say 3% greater than that calculated.

While the above described refluxing process is desirable for the preliminary accurate determination of the amount of amino-reactive oxygenated substances present, with any particular oxidation reaction mixture, the results of such a preliminary determination can be utilized wtih successive treatments of such reaction mixtures, produced under the same conditions, without making the determination in each case, and advantageously with the allowance of a small amount of added amino substance for insuring substantially complete reaction.

If a multiplicity of amino substances is to be used, they may be premixed (with or without a solvent), or they may be added as individual ingredients. In order to facilitate the carrying out of the above-described amino neutralization, addition, and condensation reactions, if any of the reacting components are normally solid, or if they are not readily miscible, it is desirable to use a limited amount of some suitable solvent (such as Stoddard's solvent, and/or benzene in the case of aromatic amines, and/or secondary butyl alcohol for aliphatic amines and/or ammonia), which solvent later will be volatilized at rubber processing temperatures prior to vulcanization. And if any of the amino reaction products are insoluble, so that they tend to separate from the reaction mixture, it is also desirable to use a solvent, as it is essential that the final composite amino reaction mixture (which may be normally solid, but is preferably liquid) shall be homogeneous at the time of its incorporation in vulcanizable rubber compositions. However, in the case of premixed amino substances, I have found that the necessity of using a solvent sometimes may be obviated by selecting as one of these substances an amine (such as aniline), which helps to keep in solution amino products, which otherwise would be insoluble.

The invention will be further illustrated by the following more detailed description of the preparation of the oxidation reaction mixtures which may be subjected to reaction with the amino substances to produce the new composite amino reaction mixtures.

Thus, for the preparation of the said controlled oxidation reaction mixtures or portions thereof (subsequently to be used in preparing amino reaction mixtures for carrying out my present invention) there may be used hydrocarbons obtained from asphalt base petroleum (naphthene base), but it is advantageous to use hydrocarbons (whether normally solid or liquid fractions, and whether or not refined as to color and/or odor) obtained from paraffin base petroleum, which mainly comprises mixtures of hydrocarbons with the type formula $C_nH_{2n+2}$. For example, highly satisfactory results in rubber compounding can be obtained from amino reaction mixtures obtained from controlled oxidation reaction mixtures of an inexpensive 45° Baumé distillate from Pennsylvania crude petroleum (generally known as "kerosene"), or from amino reaction mixtures obtained from controlled oxidation reaction mixtures of a light paraffin base oil of 36–40° Baumé, also obtained from Pennsylvania petroleum.

The said controlled oxidation reaction mixtures may be prepared from the above-described petroleum hydrocarbons in accordance with any one of several known methods, by oxidation with air, oxygen, or other oxidizing agents, usually in the presence of a catalyst (such as manganese oleate). The oxidation may be carried out in the vapor phase or in the liquid phase. But oxidation in the vapor phase is more difficult to control. In the liquid phase, while oxidation may be carried out at high temperatures and pressures, it is preferable to use relatively low temperatures (not above 160° C.) and low pressures (not above 300 lbs. per sq. in.) in that they permit slower, more readily controlled oxidation. For example, in the case of the above-mentioned 45° Baumé "kerosene," or the 36–40° Baumé oil, it is desirable to avoid chemical changes due to pyrolysis, by using an oxidizing temperature well below the thermal decomposition temperature of the hydrocarbons.

The controlled oxidation reaction conditions may be practically standardized for a wide range of hydrocarbon mixtures, including both light and heavy distillates of petroleum. For any combination of these reaction conditions (temperature, pressure, concentration of the hydrocarbons, time of contact with the oxidizing agent, type of catalytic treatment, etc.) different kinds of petroleum hydrocarbons undergo selective oxidation. And the composition of the controlled oxidation reaction mixture, and the constitution of each of the oxygenated substances contained therein, correspond to or bear a direct relation to the composition of the original mixture of hydrocarbons, for any combination of the said reaction conditions. It is essential therefore, to select the mixture of petroleum hydrocarbons to be oxidized, with reference to the reaction conditions being used.

The controlled oxidation process may be continued until the oxidation of the above-described petroleum hydrocarbons is substantially complete, or it may be interrupted at an intermediate point, a feature of the present invention being that the subsequent treatment of the controlled oxidation reaction mixture with amino substances makes it possible advantageously to use for rubber compounding, such reaction mixtures (whether the oxidizing process has been carried to completion or not) without removing any of the components thereof.

These controlled oxidation reaction mixtures may be normally solid or liquid, and depending upon the extent to which the oxidation process has been continued, they may or may not contain residual hydrocarbons, either unchanged or modified by the oxidation process. In many cases, however, it is desirable to continue the oxidation process practically to the point of the incipient separation of the less soluble oxygenated products. And if the oxidation process is continued beyond this point, so that the less soluble oxygenated products do begin to separate from the reaction mixture, it is desirable to add some solvent (such as Stoddard's solvent, benzene or secondary butyl alcohol) in quantity sufficient to ensure a homogeneous reaction mixture for subsequent treatment with amino substances. When the oxidation process has been continued up to or somewhat beyond the said point of incipient separation, the partial oxidation reaction mixtures are more readily dispersible in rubber, and show less tendency to "bloom" before or after vulcanization, than the corresponding mixtures of unoxidized petroleum hydrocarbons, indicating that any residual hydrocarbons still present have been appreciably modified by the above-described controlled oxidation treatment.

Thus, it is not essential for the purposes of my present invention that carboxylic acids be the principal product of the controlled oxidation of petroleum hydrocarbons. In fact, even under the oxidation reaction conditions which are most ideal for the formation of carboxylic acids, there is always formed a multiplicity of oxygen-containing substances (at least in limited amounts), such as alcohols, esters, lactones, aldehydes, ketones, simple carboxylic acids (which are acids containing no oxygenated group except the carboxyl group), hydroxy and ketonic carboxylic acids, and other complex oxygenated compounds. Of these, most of the simple carboxylic acids, when added to vulcanizable rubber compositions, cause an appreciable activation of vulcanization. But the hydroxy and ketonic carboxylic acids, together with practically all the other oxygen-containing substances present in the controlled oxidation reaction mixtures, act as retarders of rubber vulcanization, this retarding action being thought by those skilled in the art to be due to temporary or partial inhibition of the preliminary action of the one or more organic accelerators present, during the early stages of rubber vulcanization.

Aside from this specific vulcanization-retarding effect, however, many of these oxygenated compounds (other than the simple carboxylic acids), which are present in the controlled oxidation reaction mixtures, give desirable results when used in rubber compounding. And it is an important feature of my invention that these oxygenated compounds are now made available for use in commercial rubber compositions, by the fact that they are chemically changed during the subsequent amino treatment into derivatives which are activators of rubber vulcanization, or else (if they remain unchanged) by the fact that their vulcanization-retarding effect is more than counterbalanced by the vulcanization-activation effect of the amino neutralization, amino addition and amino condensation derivatives, which are formed during the said amino treatment of controlled oxidation reaction mixtures (or portions thereof containing amino-reactive oxygenated substances).

For example, I have found that appreciable percentages of aldehydes and amino-reactive ketones, which subsequently form aldehyde-amines and amino-ketones, respectively, (during the treatment with amino substances) are desirable with respect to the improved resistance of rubber to ageing deterioration. I have also found that certain non amino-reactive ketones and alcohols, together with the esters (which the alcohols tend to form during the oxidation process) are effective softeners of rubber, which tend to retard "scorching" (premature vulcanization) before vulcanization, and are extremely desirable agents to resist flex-cracking of the rubber after vulcanization. And this improved resistance to flex-cracking is especially important in the case of rubber compositions containing the above-described composite amino reaction mixtures, on account of the greater hardness and substantially increased modulus of such compositions after vulcanization.

For example, in the case of a rubber tire tread compound, highly loaded with carbon black, the use of composite amino reaction mixtures containing appreciable amounts of the said ketones, alcohols and esters, is extremely advantageous in that they facilitate the processing of the stiff dry rubber composition before vulcanization, and also yield a vulcanized product of excellent resistance to repeated flexing in spite of its substantially increased modulus.

By known methods, it is possible either to retard (during the controlled oxidation process) the formation of these above-described vulcanization-retarding oxygenated substances, or else to effect their removal from the controlled oxidation reaction mixture. But I have now discovered (as explained above), that the subsequent treatment with amino substances of these controlled oxidation reaction mixtures, precludes the necessity of removing or of preventing the formation of the said oxygen-containing substances, which otherwise would cause serious retardation of rubber vulcanization. Moreover, this amino treatment, leaving unchanged any esters, alcohols, and residual hydrocarbons, which may be present, does not impair their efficiency as plasticizing agents for vulcanizable rubber. Nor does this treatment of the said controlled oxidation reaction mixtures with amino substances, detract from the efficiency of the hydroxy substances present, which in rubber compositions act as anti-oxidants giving to the vulcanized product improved resistance to mechanical fatigue.

Thus, a distinctive feature of my invention is that the said amino treatment makes it possible to enjoy the potential advantages (as ingredients for rubber, with respect to softening efficiency, with respect to resistance to "scorching" and flex-cracking, and with respect to anti-oxidant effect) of the controlled oxidation reaction mixtures, and at the same time this amino treatment eliminates the retardation of vulcanization, and even causes marked positive acceleration of the rate of vulcanization, yielding vulcanized rubber products of stiffer modulus, of substantially improved quality, and of superior resistance to ageing deterioration.

It has been proposed to subject controlled oxidation reaction mixtures of petroleum hydrocarbons (containing high percentages of esters, of simple carboxylic acids, and of hydroxy carboxylic acids, but practically no unoxidized hydrocarbons) to saponification to liberate the acids present in the form of esters, in order to obtain an increased yield of carboxylic acids, after separation from the hydroxy carboxylic acids and from contaminating ketones, and to use such simple carboxylic acids in vulcanizable rubber compositions as activators of vulcanization. But I have found that the unchanged esters in such oxidation products are valuable agents in rubber compositions to resist "scorching" before vulcanization and "flex-cracking" afterwards; and that such esters and other desirable compounds can be retained without retarding vulcaniztion by converting the oxidation reaction mixture into a composite amino reaction mixture, containing the amino reaction products and also containing esters and other constituents which do not react to form amino reaction products. Instead of eliminating the hydroxy and ketonic carboxylic acids, these are advantageously retained as activators of vulcanization after they have been treated with amino substances.

Thus the amino treatment of the controlled oxidation reaction mixtures, according to the present invention, makes it unnecessary to saponify the esters or to remove the hydroxy and ketonic carboxylic acids or ketones. There is a definite economic advantage in the substantial saving thus effected in avoiding the cost of separating and purifying the simple carboxylic acids while enabling other components of the oxidation reaction mixture to be advantageously employed in the new composite amino reaction mixture.

Furthermore, the amino-neutralization, or amino-addition, derivatives of the simple carboxylic acids are more effective vulcanization activators than the free acids themselves. And when these amino-neutralization and amino-addition derivatives of simple carboxylic acids are added to rubber as components of a composite amino reaction mixture, in a form dispersed in a rubber compatible medium, their efficiency as vulcanization activators is still further increased so that substantially lower amounts are required.

In the preparation of the new composite amino reaction mixtures there are in general three types of chemical reactions which take place during the amino treatment of the composite oxidation reaction mixtures of petroleum hydrocarbons, although certain components of these oxidation reaction mixtures remain unchanged (such as esters, alcohols, and residual hydrocarbons).

Depending upon the composition of the oxidation reaction mixture and upon the amino substances added, there may be direct neutralization of carboxylic acids, there may be formation of carboxylic acid addition derivatives, and there may be formation of amino condensation derivatives of amino-reactive aldehydes and ketones, with elimination of water. A condensing agent, such as fused calcium chloride, or other suitable condensing agent, is desirable for promoting the formation of amino reaction products where the amines do not readily react in the absence of such condensing agents. For example, the condensation of amino-reactive aldehydes and ketones with primary and secondary aliphatic and aromatic amines may be promoted by the use of such condensing agents.

As soon as one or more of the amino substances and the controlled oxidation reaction mixture are stirred together the amino-neutralization and amino-addition reactions with the carboxylic acids present occur relatively rapidly with evolution of heat, while the amino-condensation reactions with aldehydes and ketones occur more slowly during long continued agitation, a period of several hours being required in some instances, although the time will vary with different amines and reaction mixtures and can be promoted by the addition of a condensing agent.

Inasmuch as the more basic amino substances, when a plurality are used, tend to react first and preferentially with the carboxylic acids, it is possible largely to control the course of the said amino neutralization, addition, and condensation reactions, either by using mixtures of amino substances of different degrees of basicity, or by consecutively adding limited amounts of different amino substances.

While primary, secondary and tertiary amines all react readily with the carboxylic acids to form amino addition derivatives, there is practically no condensation reaction between tertiary amines and aldehydes or ketones. And when secondary amines are used for the preparation of the amino condensation derivatives of aldehydes and ketones, I have found that it is preferable also to use fused calcium chloride or some other suitable condensing agent. Thus, while primary, and/or secondary, and/or tertiary amines may be used for carrying out the above-described addition reactions with carboxylic acids, the preferred method for carrying out the said amino condensation reactions with aldehydes and ketones is to use primary amines, although secondary amines with a condensing agent may be used, as above stated.

Among the valuable amino reaction products which may be produced are those resulting from the use of ammonia, whether anhydrous or aqueous, as well as resulting from the use of certain complex ammonium compounds, such as ammonium carbamate, as well as the residual urea-ammonia liquors previously mentioned. Amino-neutralization, amino-addition, and amino-condensation derivatives can thus be produced from the composite oxidation reaction mixtures.

Other advantageous amino reaction mixtures can be produced for use in rubber compounding by using relatively non-volatile aliphatic or aromatic amines or mixtures thereof having a boiling point of around 150° C. or somewhat higher, as these yield composite reaction products which do not readily volatilize from rubber compositions at processing temperatures prior to vulcanization, or even at the vulcanization temperatures which are frequently used. The oxidation reaction mixture which is subjected to reaction with the amino substances advantageously contains appreciable percentages of oxygen-containing substances of relatively high molecular weight, such as those containing 9 to 11 carbon atoms in the molecule.

The amounts of the composite amino reaction mixture employed in rubber compounding will vary somewhat with different rubber compounds and with different reaction mixtures employed. In general, only limited amounts will be added to the vulcanizable rubber compositions, for example, from 2 to 15 parts by weight per 100 parts of rubber. Such composite amino reaction mixtures may or may not contain appreciable percentages of residual unchanged or modified hydrocarbons, depending upon the extent to which the oxidation process has been continued prior to the amino treatment, but each of such amino reaction mixtures will contain substantial percentages of a multiplicity of active agents. Thus such composite amino reaction mixtures will contain plasticizers, such as esters, lactones, and certain alcohols; activators of vulcanization, such as amino-neutralization and amino-addition derivatives of carboxylic acids; and anti-oxidants or age resisters, such as certain hydroxy compounds which give to the rubber improved resistance to mechanical fatigue, and certain amino condensation derivatives of aldehydes and ketones which give to the rubber improved resistance to ageing deterioration.

Moreover the efficiency of the various active agents is increased by the fact that each such agent is uniformly and effectively introduced into the rubber composition. In fact, such extremely efficient dispersion of the said active agents (oxygen-containing substances and amino derivatives) is obtained, when added to rubber in the form of the composite amino reaction mixture that desirable results are readily obtained even with limited amounts of the active agents, in plasticizing efficiency, in positive acceleration of rate of vulcanization and in improvement in vulcanized rubber quality. Improved results can thus be obtained with small amounts of active agents, when used in the form of the composite amino reaction mixture. In addition to the superior processing properties of the well-plasticized vulcanizable rubber compositions, there is obtained improved quality of the vulcanized rubber products, together with increased efficiency of the reactive agents, enabling small amounts thereof to be effectively employed in a particularly advantageous manner.

In some cases it is advantageous to dilute the composite amino reaction mixture with a suitable organic solvent of low boiling point, when used for compounding rubber mixes on the mill.

It is also advantageous in some cases to use aqueous dispersions of the composite amino reaction mixture for addition in rubber compounding on the mill. The presence of water in regulated amount aids in preventing overheating and scorching during the compounding on the mill while the water will at the same time be removed during the compounding operation.

The new amino reaction mixtures are also advantageously used in rubber latex compositions or with aqueous dispersions of natural or synthetic rubber. These composite amino reaction mixtures, or solutions of the same, act as stabilizers to prevent premature coagulation when added to such latex or dispersions, as well as when added to other colloidal dispersions, whether in water or oil.

The new composite amino reaction mixtures are also advantageously used for wetting the pigments, such as zinc oxide or other powders, which are to be incorporated in liquid rubber latex. This can be accomplished, for example, by grinding in a ball mill. When thus added directly or indirectly to vulcanizable aqueous rubber dispersions, the composite amino reaction mixtures, or solutions thereof, present advantages in the processing of the vulcanizable rubber mixtures and in the improved quality of the vulcanized rubber products similar to those above described in connection with the addition of said composite amino reaction mixtures to vulcanizable solid crude rubber compositions.

It is one advantage of the present invention that the amino reaction mixtures are readily obtainable in a homogeneous form and can also be readily converted into solutions or emulsions of a substantially homogeneous nature in which form they are particularly advantageous as wetting agents not only for use in rubber compounding, and with rubber compounding ingredients, but also as wetting agents for a variety of purposes, as dispersing or stabilizing agents for colloidal dispersions of rubber and other substances, and as penetrating agents in connection with the impregnation of fibrous materials or solids with rubber emulsions or suspensions and other substances.

Depending upon the petroleum hydrocarbons treated, and upon the extent of the controlled oxidation process, and upon the amino substances used, the resulting homogeneous amino reaction mixture may be more soluble in water or more soluble in organic solvents. In either case, however, there is present in the homogeneous amino reaction mixture limited amounts of insoluble substances which however become emulsified when a major portion of the homogeneous amino reaction mixture goes into "solution," whether the solvent be water or some organic liquid.

Thus when homogeneous amino reaction mixtures are "dissolved," the reaction mixtures may seem to be completely soluble in water while actually containing appreciable percentages of water-insoluble components which are dispersed in an extremely finely divided stable colloidal state during the process of solution, due apparently to the emulsifying and dispersing and dissolving effect of the water-soluble components of the reaction mixture. These homogeneous amino reaction mixtures which seem to be completely soluble in organic solvents actually contain appreciable percentages of components insoluble in the organic solvent but which become dispersed in an extremely finely divided stable colloidal state during the process of dissolving the major portion of the reaction mixture in the organic solvents, due apparently to the dissolving effect of the soluble constituents upon the insoluble constituents.

As a result, a "solution" of the homogeneous amino reaction mixtures may be clear in appearance but actually comprise a complex dispersed system in which the "solution" is the continuous phase and an appreciable percentage of one or more insoluble components is the dispersed phase. These solutions, whether aqueous or with an organic solvent, are in the nature of colloidal solutions or emulsions or suspensions, but they form valuble homogeneous composite products which are valuable for rubber compounding and other purposes, having valuable wetting and dispersing properties as well as stabilizing properties. Accordingly these homogeneous amino reaction mixtures or solutions may advantageously be used as dispersing agents in the preparation of colloidal d'spersions and other dispersions or ingredients used in rubber compounding and for other purposes or they may be used as effective stabilizing agents for colloidal dispersions or suspensions which have been previously prepared.

The composite nature of the homogeneous amino reaction mixtures, whether they be more soluble in water or more soluble in organic liquids, thus embody valuble and advantageous auto-emulsification properties whereby the insoluble substances are effectively "dissolved" or dispersed through the "solution" and give a valuable homogeneous amino reaction mixture in the form of a solution which is valuable as a wetting agent for rubber pigments and other substances and for use in rubber compounding and for other purposes, for example, in making colloidal dispersions or as a penetrating agent for fibrous or solid materials, in rubber compounding and for other purposes.

Moreover, on account of the mutual solubility of the soluble and insoluble components in the said amino reaction mixtures obtained from partially oxidized petroleum hydrocarbons, it is possible solely by the continued gradual addition (with efficient agitation) of the dispersion medium (whether water or an organic liquid) to carry the first formed dispersion through a reversal of phase, thereby transforming the first formed dispersion (for which the amino reaction mixture is the continuous phase) into a dispersion having the amino reaction mixture as the disperse phase.

For example, in the case of the homogeneous composite amino reaction mixture obtained by reacting the equivalent weight of the aforementioned by-product ammoniacal urea liquor with a controlled oxidation product of Pennsylvania petroleum (having an acid number of 140, and comprising approximately one-third simple carboxylic acids, one-third hydroxy carboxylic acids and one-third esters), I have found that fifty to sixty per cent of water may be incorporated to yield a stable water-in-oil emulsion. With the continued gradual addition of water, however, I have found that the incorporation of eighty to ninety per cent of water yields a stable oil-in-water type emulsion.

Thus, the amount of dispersion medium which can be added before the reversal of phase occurs, depends upon the ratio of soluble to insoluble substances present. But an important feature of my present invention is the possibility of preparing both water-in-oil and oil-in-water type emulsions from the same amino reaction mixture, simply by means of the direct incorporation of a dispersion medium (whether water or an organic liquid).

The twofold compatibility of the said "solutions" of homogeneous amino reaction mixtures is an additional advantage in their application as dispersing, stabilizing, wetting and penetrating agents. Thus aqueous "solutions" of homogeneous amino reaction mixtures are valuable for oil-in-water type emulsions, while "solutions" in organic solvents are valuable for water-in-oil type of emulsions.

As an example of the use of such a "solution" for an oil-in-water type of emulsion, an aqueous "solution" of the homogeneous amino reaction mixture which is largely water-soluble provides a self-emulsified dispersion of insoluble components, such as esters or modified or unchanged hydrocarbons in the reaction mixture itself, and also for added emulsion constituents such as asphalt or mineral rubber, etc., to be used in rubber compounding and for other purposes. Such solutions or dispersions are efficient in stabilizing the emulsion.

As another example of the use of such "solutions" may be mentioned the impregnation of fibrous material, such as in the impregnation of textiles with rubber latex, etc., where the use of a limited percentage of a water "solution" of a homogeneous amino reaction mixture effectively promotes the penetration of the textile fabrics by the rubber particles and improves the uniformity of the dispersion of the rubber particles through the fabric. Such a "solution" can be used for treating the fabric before the application of the rubber emulsion thereto, or may be included in the rubber emulsion itself, or can be used both for preliminary treatment of the fabric and in the emulsion applied thereto.

Another advantageous application of the invention is in making rubber cements by incorporating in such cements, in addition to the constituents commonly used therein, or to replace, in whole or in part, certain of such constituents, a regulated amount of a composite amino reaction mixture which imparts improved properties to the cement composition, facilitating the incorporation of other ingredients, and improving the stability and application and subsequent vulcanization thereof or of the rubber composition remaining after the removal in whole or in part of the volatile cement solvent.

The composite reaction mixtures containing all of the reaction products of the amino substances with the amino-reactive constituents of the oxidized hydrocarbons (acids, aldehydes and ketones, etc.) together with the non-amino-reactive substances present, such as esters, and unchanged hydrocarbon, etc., are valuable rubber compounding compositions, and they can be produced with a wide range of variation in their constituents.

While the use of such a total composite amino reaction mixture is particularly advantageous, certain of the advantages of the invention can be obtained with the use of fractions or portions of such a reaction mixture, obtainable, for example, by first separating the oxidized petroleum into fractions and separately treating the different fractions with the amino substances, to form composite amino reaction mixtures which contain a part only of the components of the total mixture, reacted with the amino substances. A fraction or portion of an oxidized petroleum containing, for example, around 15% of simple carboxylic acids, around 40% esters, and the remainder mainly hydrocarbons, with only small amounts of aldehydes and ketones, but with a range of carboxylic acids, gives, when reacted with ammonia or amines to form an amino reaction mixture, a valuable rubber compounding material for certain purposes.

Again, a fraction or portion of oxidized petroleum containing roughly one-third simple carboxylic acids, one-third hydroxy acids and one-third esters, with small amounts of ketones, etc., gives when reacted with ammonia or amines a composite amino reaction mixture which is also valuable in rubber compounding for certain purposes. Such a composition, being relatively free from hydrocarbons, and with lower ester content, has less softening effect than the composition above mentioned, and also gives less activation because of the presence of the hydroxy compounds.

As a further example, I may use in a high carbon black rubber tread stock for pneumatic tires a limited amount (such as 2 to 4 parts by weight per 100 parts rubber) of a homogeneous composite amino reaction mixture, or solution of the same, obtained by the reaction of the equivalent weight of the hereinbefore described by-product ammoniacal urea liquor with a mixture of refined simple carboxylic acids obtained from one or more controlled oxidation reaction mixtures of petroleum hydrocarbons.

Moreover, in practicing my present invention, I may use for rubber compounding purposes the homogeneous composite amino reaction mixture obtained by treating with one or more amino substances a portion of a controlled oxidation reaction mixture of petroleum hydrocarbons (the said portion containing an appreciable percentage of amino-reactive oxygenated substances) to which portion has been added (prior to or subsequent to its treatment with amino substances) a substantial percentage of one or more simple carboxylic acids, such as the mixture of acids obtained by the hydrolysis of animal fats (the said mixture in addition to small percentages of myristic and linoleic acids, comprising, e. g., approximately 24 per cent palmitic, 60 per cent oleic, and 16 per cent stearic acids), and/or a complex mixture of refined simple carboxylic acids obtained from one or more controlled oxidation reaction mixtures of petroleum hydrocarbons. Such acid or acids may be added directly, or in the form of a solution or dispersion.

For example, in order to secure improved resistance to repeated flexing in the case of a black rubber tread stock, I may use a portion of the reaction mixture (obtained by the controlled oxidation of fuel oil from Pennsylvania petroleum) comprising by weight approximately one-third hydroxy carboxylic acids, one-third simple carboxylic acids, and one-third esters, to which portion prior to or subsequent to its reaction with amino substances, has been added (in order to secure increased activation of vulcanization) a substantial amount (such as fifty per cent by weight) of single pressed stearic acid, in the form of a dispersion. And in order to avoid premature vulcanization ("scorching") of the said rubber tread composition during processing, I may dilute the said homogeneous composite amino reaction mixture containing stearic acid (which stearic acid may have been added prior to or subsequent to the reaction with one or more amino substances) with an appreciable amount of water and/or of one or more comparatively volatile organic solvents, the said water or solvents subsequently serving to cool the batch of rubber tread composition by being evaporated at the elevated processing temperature prior to vulcanization.

One or more simple carboxylic acids, such as stearic acid, may advantageously be added to the composite amino reaction mixture, whether such mixture is obtained by reacting a portion of an oxidation mixture with amino substances or by reacting the homogeneous unrefined or unseparated or unfractionated reaction mixture with amino substances.

In rubber compounding the use of such amino reaction mixtures containing free simple carboxylic acids added thereto will give an increased vulcanization-activation effect, inasmuch as the primary activation caused by the direct action of the amino substances on the organic accelerator will be supplemented by an additional activation effect caused by the presence of the free acids which will react, for example, with zinc oxide.

Furthermore, when the composite amino reaction mixtures, whether of the total oxidation reaction mixture or a portion thereof, and containing added free simple carboxylic acids, are diluted with water, prior to or at the time of addition to a water-base dispersion, the acids being mutually "soluble" in the components of the amino reaction mixture but insoluble in water, become emulsified in the form of extremely finely divided stable dispersions, as the amino derivatives go into solution. And this self-emulsified dispersion of insoluble acids effectively serves as a stabilizing agent for the original water-base dispersion. In the case of dispersions in organic liquids, the free acids themselves may dissolve in the organic liquid and such insoluble amino derivatives as are present in the composite amino reaction mixture become self-dispersed and act as stabilizing agents.

The new compositions obtained by adding simple carboxylic acids to composite amino reaction mixtures, whether of the whole or a portion of the oxidation reaction mixture, are thus particularly valuable for use in compounding rubber as well as for other purposes. In producing such composite products the free simple fatty acid or acids may first be formed into a solution or dispersion to facilitate their incorporation where the free fatty acid itself is not readily dispersed and incorporated in the composite amino reaction mixture.

One of the important advantages of the composite amino reaction mixtures in rubber compounding is their activating effect upon Captax or mercaptobenzothiazole when used in rubber compounding together with an appreciable amount of a metallic oxide, such as zinc oxide or litharge.

In general the improved rubber compounding process of the present invention includes the preliminary step of compounding vulcanizable rubber compositions with regulated amounts of one or more of said composite amino reaction mixtures, and the subsequent step of vulcanizing the rubber composition thus compounded.

Commercial rubber compositions vary widely in their content of rubber, fillers, pigments, etc., depending upon the purposes for which the vulcanized rubber products are to be used; and it is one advantage of the present invention that the new composite amino reaction mixtures are adapted for use with advantage in a wide range of rubber compositions and products.

The preliminary compounding operation can be carried out in different ways, such as those commonly used in rubber compounding. The composite amino reaction mixtures may be used as such, or in the form of solutions or emulsions. They may be incorporated directly in the rubber composition, as by adding them, or solutions or emulsions thereof, to aqueous dispersions of rubber; or they can be incorporated by mechanical admixture with solid natural or synthetic rubber on open mill rolls or in internal mixers, such as those of the Banbury type. They have the important advantage of facilitating the milling or mechanical mixing of rubber compounds, because of their action as softeners, and thus enable the milling and compounding of pigments, etc., to be facilitated. They may be added directly to the rubber compositions, either as such or in the form of solutions or emulsions; or they may be added indirectly to the rubber compositions, as by first admixing them with zinc oxide or carbon black or other pigments or fillers, and the resulting admixture subsequently incorporated in vulcanizable rubber compositions. They may, for example, be incorporated with mineral rubber (partially oxidized asphalt) and the resulting admixture then added to and incorporated in the rubber composition.

In the case of normally solid composite amino reaction mixtures, they may be added in a heated and melted state, or in solution. Those which are normally liquid may be added directly, for example, on the mill, or they may be applied by spraying or washing the surfaces of sheeted rubber.

The amount of the composite amino reaction mixtures used may vary with the different compounds. In certain cases, relatively high percentages of such mixtures may be used without objectionable degradation of vulcanized quality. It is usually advantageous, however, to use the minimum amount commensurate with the beneficial results desired. As previously explained, the composite amino reaction mixtures fulfill a variety of functions before, during and after vulcanization of the rubber compositions. The amount needed in any particular instance will vary with the requirements of the particular composition and product.

While the new composite amino reaction mixtures combine in themselves a number of desirable properties, such that in some cases they can be used alone without other plasticizing agents, vulcanization activators and anti-oxidants; they may also be used advantageously with one or more of such other agents.

Generally speaking, as previously stated, the amount of the composite amino reaction mixture used may vary from around 2 to 15 parts by weight per 100 parts by weight of rubber; but it will be understood that the quantity used for any particular composition will depend upon considerations such as the requirements of the processing properties of the vulcanizable rubber composition, the quality of the vulcanized rubber product, considerations of cost, etc.

The optimum amount of the composite amino reaction mixtures may be determined on the basis of laboratory tests, such as are commonly applied in testing rubber compositions or on the basis of semi-production scale factory tests or even practical service tests, such as are customarily employed in testing rubber products. Such tests include laboratory tests such as Williams plastometer determinations, rate of cure and tensile strength studies, flexing machine tests, accelerated ageing tests, semi-production scale factory tests such as "bloom" tendency and processing properties of the rubber compositions, and practical road service tests in the case of pneumatic tires.

In the case of pneumatic tire rubber tread compositions, a relatively large amount of one or more of the composite amino reaction mixtures may be used, and such use facilitates the use of large percentages of carbon black, due to the efficient plasticizing effect of such mixtures and the superior resistance to scorching prior to vulcanization which they provide, and also due to the improved resistance to repeated flexing which they impart to the more highly loaded vulcanized tread products. In addition to such advantages, the composite amino reaction mixtures also cause acceleration of the rate of vulcanization and give improved resistance to ageing deterioration of the rubber compositions, thus supplementing or replacing ingredients commonly used to accomplish such results.

In the case of less highly loaded black rubber tread compositions, smaller amounts of the composite amino reaction mixtures may be used to obtain their advantages as a plasticizer which does not "bloom" and which will not discolor an adjacent white rubber strip on the side wall of the tire, as well as to obtain other advantages from the use of such composite amino reaction mixtures.

In rubber reclaiming, one or more of the composite amino reaction mixtures may be advantageously used either without or with other plasticizing agents for softening the vulcanized rubber scrap, and they will serve as activators of vulcanization when the reclaimed rubber composition is subsequently vulcanized, and will also impart other advantages in connection with the production of the compounded and vulcanized reclaimed product.

As another illustration of the application of the composite amino reaction mixtures for rubber compounding, they may be added to rubber latex mixtures such as are used for "backing" automobile upholstery fabric; and they have the advantage that they are water soluble or self-emulsifiable and may be readily incorporated in the aqueous rubber dispersion, while also serving as efficient activators of vulcanization and enabling a well vulcanized rubber film to be produced on the back of the upholstery fabric having excellent resistance to mechanical fatigue and to ageing deterioration.

While the above examples illustrate different applications of the invention, in the production of different rubber compositions, it will be understood that the composite amino reaction mixtures may be used as ingredients of vulcanizable rubber or rubber-like compositions of the most varied nature, whether or not admixed with fillers or pigments, etc., and including both natural and synthetic rubber, reclaimed rubber, balata and gutta-percha, as well as polymers, isomers and derivatives of rubber, and natural rubber latex or other aqueous dispersions or emulsions of rubber.

In such compounding operations the composite amino reaction mixtures may be normally solid or liquid and may be added as such or in solution or emulsion, and in amounts which can readily be determined for different rubber compositions, in accordance with common testing practice in rubber compounding.

The invention will be further illustrated by the following more detailed description and examples.

A series of tests were made with a commercial black rubber tread composition highly loaded with carbon black, activated with stearic acid, and accelerated with mercapto-benzo-thiazole (captax) with the addition, in one case, of pine tar, in another case of an oxidation reaction mixture which had not been treated with amino compounds, and in other cases with composite amino reaction mixtures.

The partially oxidized mixture of petroleum hydrocarbons used in these tests was the controlled oxidation reaction mixture of a refined medium heavy distillate from Pennsylvania petroleum, from which substantially all the normally solid hydrocarbons had been removed by refrigeration and pressure, and which had been subsequently oxidized under controlled conditions in the liquid phase, until the oxidation reaction mixture yielded the following constants:

Acid number _____ 29.0
Saponification number _____ 95.0
Specific gravity _____ 91.5
Pour point _____° F__ 35–40
Flash point _____° F__ 315–325
Fire point _____° F__ 370–380
Viscosity (Saybolt Universal at 100° F.) _____secs__ 300–325

This controlled oxidation reaction mixture, untreated (B), and also after being respectively treated with amino substances, as shown in the following four recipes (C, D, E, and F), was tested in the said commercial black rubber tread compound (T) (which was in all cases activated with stearic acid) in comparison with pine tar (A), the plasticizer regularly used commercially in this tread.

The treatment of the said controlled oxidation reaction mixture with amino substances, as shown in the following four recipes (C, D, E, and F), simply comprised direct admixture of the respective amino substances, without being heated and at atmospheric pressure, with efficient mechanical agitation during an interval of ten hours.

*Composite amino reaction mixtures*

|  | C | D | E | F |
|---|---|---|---|---|
| B (controlled oxidation reaction mixture) | 100 | 100 | 100 | 100 |
| 28% aqueous ammonia | 3.3 | 8.7 |  |  |
| Aniline |  |  | 13 |  |
| Triethylene tetramine |  |  |  | 7.7 |
|  | 103.3 | 108.7 | 113.0 | 107.7 |

Thus the following six plasticizers were compared in the said commercial rubber tread compound:

A. Pine tar.
B. Controlled oxidation reaction mixture.
C. Equivalent ammonia reaction mixture.
D. Excess ammonia reaction mixture.
E. Aniline reaction mixture.
F. Triethylene tetramine reaction mixture.

In order to compare these six plasticizers, six equal small batches were taken from a large factory-mixed batch of the said commercial rubber tread compound (T) (already containing stearic acid and all other ingredients except the plasticizer) and to each of these six small experimental batches were respectively added ten parts by weight per one hundred parts rubber, of one of the six plasticizers, listed above.

Of each of these six rubber tread compositions, containing an excess of plasticizer, sheets were vulcanized 45 minutes at 274° F., and the following results were obtained as to modulus, ultimate tensile strength, and final elongation:

| Tread composition | Pounds per square inch | | | Per cent final elongation |
|---|---|---|---|---|
| | Modulus at 300% elongation | Modulus at 600% elongation | Ultimate tensile strength | |
| T—A | 540 | 2,120 | 3,800 | 790 |
| T—B | 520 | 2,180 | 3,350 | 740 |
| T—C | 610 | 2,500 | 3,870 | 750 |
| T—D | 840 | 3,290 | 4,180 | 700 |
| T—E | 980 | 3,630 | 4,300 | 670 |
| T—F | 1,200 | 4,020 | 4,370 | 640 |

Inasmuch as each of these six tread compositions was activated by stearic acid (2.5 parts per 100 parts rubber) the comparative results listed above show whatever additional activation of vulcanization has been provided by the excess of plasticizer (10 parts per 100 parts rubber).

The results for tread (T—B) provided by the "controlled oxidation reaction mixture" (B) are substantially the same as those for the control tread (T—A) provided by "pine tar" (A), indicating that the vulcanization-activation effect, which would have been expected from the carboxylic acids present in the "controlled oxidation reaction mixture" (B), has been counterbalanced by the vulcanization-retardation effect of the hydroxy and ketonic substances also present.

For each of the last four tread compositions (T—C, T—D, T—E, and T—F), however, the treatment of this same "controlled oxidation reaction mixture" (B) with an amino substance has caused substantial additional activation of vulcanization. The results for tread (T—D) provided by "excess ammonia reaction mixture" (D), indicate more complete vulcanization than is provided by "equivalent ammonia reaction mixture" (C) in tread (T—C). And the "triethylene tetramine reaction mixture" (F) has provided a greater vulcanization-activation effect in tread (T—F) than that given by "aniline reaction mixture" (E) in tread (T—E).

Thus, the preceding examples, for tread compositions activated by stearic acid in all cases, shows the additional vulcanization-activation effect and other advantages provided by each of four different composite amino reaction mixtures (C, D, E, and F), prepared from a partially oxidized petroleum distillate, in comparison with that for the partially oxidized petroleum distillate itself (B), untreated with amino substances.

The following examples show the comparative vulcanization-activation effect, with and without stearic acid, of various composite amino reaction mixtures prepared from a controlled oxidation reaction mixture (G), having an acid number higher than for the said controlled oxidation reaction mixture (B), used in the above example.

For this second series of tests, a partial oxidation reaction mixture (G) was selected, which had been prepared from an unrefined 45° Baumé fuel oil distillate of Pennsylvania petroleum, by controlled oxidation in the liquid phase, until it gave the following constants:

Acid number _____ 48.8
Saponification number _____ 115.6
Flash point _____°F__ 175
Fire point _____°F__ 195
Viscosity (Saybolt Universal at 100° F.) ___ 53

From this controlled oxidation reaction mixture (G), two composite amino reaction mixtures (H and I, as shown in the following formulae) were prepared by direct admixture of the amino substances, without being heated and at atmospheric pressure, with mechanical agitation for ten hours.

*Composite amino reaction mixtures*

| | H | I |
|---|---|---|
| G (controlled oxidation reaction mixture) | 100 | 100 |
| Triethylene tetramine | 3 | --- |
| Aniline | 5.98 | 19 |
| | 108.98 | 119 |

The above composite amino reaction mixtures (H and I) were tested with and without stearic acid, in comparison with a combination of stearic acid and pine tar, in a rubber tread composition highly loaded with carbon black and accelerated with mercapto-benzo-thiazole, as shown in the following five formulae.

*Black rubber tread compositions*

| | 1 | 2 | 3 | 4 | 5 |
|---|---|---|---|---|---|
| Smoked sheet rubber | 100 | 100 | 100 | 100 | 100 |
| Zinc oxide | 5 | 5 | 5 | 5 | 5 |
| Carbon black | 50 | 50 | 50 | 50 | 50 |
| Sulfur | 2.75 | 2.75 | 2.75 | 2.75 | 2.75 |
| Mercapto-benzo-thiazole (Captax) | 1.25 | 1.25 | 1.25 | 1.25 | 1.25 |
| Phenyl β-naphthyl amine (Agerite powder) | 1.0 | 1.0 | 1.0 | 1.0 | 1.0 |
| Stearic acid | 4 | 2 | 2 | --- | --- |
| Pine tar | 5 | --- | --- | --- | --- |
| H (amino reaction mixture) | --- | 7 | --- | --- | --- |
| I (aniline reaction mixture) | --- | --- | 7 | 4 | 8 |

Sheets of each of the above five black rubber tread compositions, respectively vulcanized 35, 50, and 70 minutes at 260° F., gave the following results with respect to modulus, ultimate tensile strength (breaking load), and final elongation:

| Tread compound | Minutes vulcanized at 274° F. | Pounds per square inch | | | Per cent final elongation |
|---|---|---|---|---|---|
| | | Modulus at 300 per cent elongation | Modulus at 500 per cent elongation | Ultimate tensile strength | |
| 1 | 35 | 530 | 1,540 | 2,430 | 720 |
| | 50 | 780 | 2,050 | 3,900 | 710 |
| | 70 | 1,170 | 2,730 | 4,390 | 680 |
| 2 | 35 | 1,250 | 2,850 | 3,900 | 640 |
| | 50 | 1,400 | 3,020 | 3,960 | 610 |
| | 70 | 1,510 | 3,220 | 4,200 | 620 |
| 3 | 35 | 1,070 | 2,490 | 3,320 | 600 |
| | 50 | 1,240 | 2,850 | 4,040 | 625 |
| | 70 | 1,490 | 3,180 | 4,240 | 610 |
| 4 | 35 | 1,000 | 2,470 | 3,820 | 670 |
| | 50 | 1,240 | 2,760 | 4,230 | 680 |
| | 70 | 1,370 | 2,960 | 4,450 | 670 |
| 5 | 35 | 870 | 2,260 | 3,680 | 680 |
| | 50 | 1,160 | 2,650 | 4,330 | 690 |
| | 70 | 1,320 | 2,880 | 4,380 | 640 |

The above physical test results for the first three experimental tread compositions (1, 2, and 3) indicate that the "amino reaction mixture"

(H) and the "aniline reaction mixture" (I), each cause substantially more complete vulcanization with two parts of stearic acid than is obtained with four parts of stearic acid and five parts of pine tar (tread #1). Moreover, a comparison of treads #2 and #3 indicates that "amino reaction mixture" (H), containing both triethylene tetramine and aniline, is an appreciably more efficient vulcanization-activator than "aniline reaction mixture" (I), containing an excess of aniline alone.

However, a comparison of treads #4 and #1 indicates that the said "aniline reaction mixture" (I) with no stearic acid, provides substantially more complete vulcanization in tread #4, than is obtained in tread #1 from an equal weight of stearic acid with five parts of pine tar. Moreover, a comparison of treads #4 and #3 indicates that four parts of "aniline reaction mixture" (I) with no stearic acid in tread #4, provides substantially as complete vulcanization as is obtained in tread #3 with seven parts of the same "aniline reaction mixture" (I) in addition to two parts of stearic acid.

Furthermore, a comparison of treads #4 and #5 indicates that four parts of the said "aniline reaction mixture" (I) provides as complete vulcanization in tread #4 as is obtained in tread #5 with twice as much of the same vulcanization-activator.

While I do not wish to limit myself by any theoretical explanation or considerations as to the improved results obtained, I am lead to believe that the improved results obtained by the use of the composite amino reaction mixtures in rubber compounding are due to the composite nature of the mixtures, and to the different and various reaction products which they contain, such that the composite mixture provides, in a single composite composition, the properties desirable in rubber compounding, such as have heretofore required the use of a number of different compounding chemicals and materials, which can be replaced or supplemented by the use of the new composite amino reaction mixture.

It will be evident from the foregoing disclosure, and from the illustrated examples, that a wide range of composite amino reaction mixtures can be prepared and advantageously used, varying somewhat with the particular petroleum hydrocarbon subjected to oxidation, the conditions of the partial and regulated oxidation treatment, and the particular amino compound or compounds employed for reacting therewith to form the composite amino reaction mixture. The foregoing examples are intended to be illustrative of the invention, but it will be understood that the invention is not limited thereto. Many modifications and variations of the invention may be made, as hereinbefore indicated, without departing from the spirit and scope thereof.

From the foregoing description, it will be evident that the present invention enables important advantages to be obtained in rubber compounding. It provides a class of new and improved ingredients for rubber compounding which will function as efficient plasticizing agents for vulcanizable rubber, and will give practically no "bloom" effect (migration to the surface of the rubber) before or after vulcanization. It provides a class of new and improved composite ingredients for rubber compounding which will function as effective activators of rubber vulcanization, positively accelerating the rate of vulcanization, and yielding vulcanized rubber products with stiffer modulus and other substantially improved physical properties. It provides a class of new and improved composite ingredients for vulcanizable rubber compositions, which will yield vulcanized rubber products having improved resistance to flexing and to other repeated stresses. It provides a class of new and improved composite ingredients for rubber, which will impart to rubber compositions before and after vulcanization, improved resistance to ageing deterioration on exposure to light, heat and air. It provides a class of new and improved composite ingredients for rubber, each of the said composite ingredients comprising a multiplicity of active agents, dissolved or dispersed in a reaction mixture, which may be readily incorporated in commercial rubber compositions. It provides a class of new and improved composite ingredients for rubber, which will be water-soluble or self-emulsifying, so that they may be stirred directly into rubber latex, and/or into other aqueous dispersions of natural or synthetic rubber, and/or into other colloidal dispersions (whether water-base or oil-base). It provides a class of new and improved composite ingredients for rubber, which can be prepared cheaply by simple means from one or more petroleum hydrocarbons. It provides as new compositions of matter, which may be used for the aforementioned variety of industrial applications, homogeneous composite amino reaction mixtures obtained from homogeneous unrefined reaction mixtures previously obtained by the controlled oxidation of one or more petroleum hydrocarbons.

From the standpoint of rubber compounding and vulcanizing, and the production of vulcanized rubber compositions, it will be evident that the invention enables important advantages to be obtained, of the nature previously referred to.

While the new homogeneous composite amino reaction mixtures, or solutions of the same, have been more particularly described in connection with rubber compounding, for which purposes they are particularly advantageous, they are also of value for a variety of industrial applications, such as dispersing agents, as stabilizers of asphalt and other emulsions (whether water-base or oil-base), as penetrating agents to bring about the more efficient impregnation of textiles or other fibrous materials, as wetting agents for zinc oxide, carbon black and other pigments which are to be dispersed in rubber latex or other emulsions, as well as ingredients for general rubber compounding purposes, etc.

In the accompanying claims, I refer to a composite amino reaction mixture resulting from the reaction with amino substances of a composite partial oxidation reaction mixture of petroleum hydrocarbons, in its broader sense, to include the composite amino reaction mixtures obtainable by treating controlled oxidation reaction mixtures of petroleum hydrocarbons as a whole, or portions or fractions thereof, with amino substances, both inorganic and organic, and including ammonia alone, or ammonia with an amine or amines, used simultaneously or successively, or an amine alone, or a mixture of amines, etc., as hereinbefore described. Such amino reaction mixtures will contain a plurality of different substances, which will vary with the particular oxidation reaction mixture treated with the amino substances, and will vary with the different oxidation mixture or portion or fraction thereof treated as well as with the particular amine or amines, etc., used. Such composite amino reaction mixtures may thus contain varying amounts of softening and plasticizing constituents which are valuable in the milling and plasticizing of rubber compositions; vulcanization accelerators which are valuable in accelerating the rate of vulcanization; activators of vulcanization which are valuable in activating other accelerators of vulcanization; anti-oxidants against ageing, anti-oxidants to increase resistance to heating, etc., which are valuable in imparting ageing resisting properties; vulcanization retarders or scorch resisters which are valuable in the compounding of the rubber and in preventing or retarding curing during compounding; flex-resisters which are valuable in imparting resistance to mechanical fatigue to the resulting rubber products; etc. The chemical nature of the various constituents of the composite amino reaction mixtures has been hereinbefore pointed out; and the compositions are particularly valuable for certain compounding purposes where they contain both amino neutralization and amino condensation derivatives or where they contain substantial amounts of both amino-reacted and non-amino reactive constituents, as well as compositions which contain a plurality of different constituents which impart a number of important advantages when the composite amino reaction mixture is used for rubber compounding.

In referring to the total partial oxidation reaction mixture of petroleum hydrocarbons it will be understood that certain constituents may be removed therefrom such as tarry materials which may be separated during or at the end of the oxidation, or water soluble constituents which may be removed in water solution; and it will be understood that the resulting total reaction mixture may also in some cases advantageously be separated into portions or fractions before treatment with the amino substances, while in other cases the total oxidation reaction mixture can be advantageously so treated.

I claim:

1. The improvement in the production of vulcanized rubber compositions which comprises compounding with the rubber a composite amino reaction mixture resulting from the reaction of an amino substance with a reaction mixture containing carboxylic acid and non-acid oxygenated bodies produced by the partial oxidation of petroleum hydrocarbons normally liquid or solid, and subsequently vulcanizing the composition.

2. The improvement in the production of vulcanized rubber compositions which comprises compounding with the rubber at least one accelerator of vulcanization, together with a composite amino reaction mixture resulting from the reaction of an amino substance with a reaction mixture containing carboxylic acid and non-acid oxygenated bodies produced by the partial oxidation of petroleum hydrocarbons normally liquid or solid, said mixture containing a substantial amount of activators of vulcanization, and subsequently vulcanizing the composition.

3. The improvement in the production of vulcanized rubber compositions having valuable ageing resistant properties which comprises compounding with the rubber a composite amino reaction mixture resulting from the reaction of an amino substance with a reaction mixture containing carboxylic acid and non-acid oxygenated bodies produced by the partial oxidation of petroleum hydrocarbons normally liquid or solid, said mixture including a substantial amount of anti-oxidants against ageing, and subsequently vulcanizing the composition.

4. The improvement in the compounding of vulcanizable rubber compositions which comprises adding to the rubber a composite amino reaction mixture resulting from the reaction of an amino substance with a reaction mixture containing carboxylic acid and non-acid oxygenated bodies produced by the partial oxidation of petroleum hydrocarbons normally liquid or solid, said mixture containing a substantial amount of scorch-resisters, and subjecting the resulting mixture to mechanical working to accomplish the compounding without objectionable scorching.

5. The improvement in the production of vulcanizable rubber compositions which comprises compounding with the rubber a composite amino reaction mixture resulting from the reaction of an amino substance with a reaction mixture containing carboxylic acid and non-acid oxygenating bodies produced by the partial oxidation of petroleum hydrocarbons normally liquid or solid, said mixture containing a plurality of amino reaction products with a plurality of reactive oxidation products, and said mixture also containing non-amino-reactive constiuents.

6. The improvement in the production of vulcanized rubber compositions which comprises compounding with the rubber a composite amino reaction mixture resulting from the reaction of an amino substance with a reaction mixture containing carboxylic acid and non-acid oxygenated bodies produced by the partial oxidation of petroleum hydrocarbons normally liquid or solid, said mixture being added in the form of a homogeneous solution or dispersion of a multiplicity of amino derivatives and oxygen-containing substances in an organic solvent, and subsequent vulcanizing the composition.

7. The improvement in the production of vulcanized rubber compositions which comprises compounding with the rubber a composite amino reaction mixture resulting from the reaction of an amino substance with a reaction mixture containing carboxylic acid and non-acid oxygenated bodies produced by the partial oxidation of petroleum hydrocarbons normally liquid or solid, said mixture being added in the form of a homogeneous aqueous dispersion of a multiplicity of amino derivatives and oxygen-containing substances in water, and subsequently compounding the composition with elimination of the water, and vulcanizing the composition.

8. The improvements in the production of rubber articles from latex and aqueous dispersions of rubber which comprises adding thereto a composite amino reaction mixture compatible therewith resulting from the reaction of an amino substance with a reaction mixture containing carboxylic acid and non-acid oxygenated bodies produced by the partial oxidation of petroleum hydrocarbons normally liquid or solid, and vulcanizing the composition after removal of water therefrom.

9. The improvement in the compounding of pigments in rubber compositions which comprises intimately admixing the pigment with a composite amino reaction mixture resulting from the reaction of an amino substance with a reaction mixture containing carboxylic acid and non-acid oxygenated bodies produced by the partial oxidation of petroleum hydrocarbons normally liquid or solid, and subsequently incorporating the thus compounded pigment with the rubber composition.

10. The improvement in the production of vulcanized rubber compositions which comprises compounding with the vulcanizable rubber a composite amino reaction mixture resulting from the reaction of an amino substance with a reaction mixture containing carboxylic acid and non-acid oxygenated bodies produced by the partial oxidation of petroleum hydrocarbons normally liquid or solid and also compounding a material selected from the class consisting of a higher fatty acid and an amino reaction product thereof, and subsequently vulcanizing the composition.

11. The improvement in the production of vulcanized rubber compositions with the use of reclaimed rubber, which comprises the preliminary step of adding to reclaimed rubber a composite amino reaction mixture resulting from the reaction of an amino substance with a rection mixture containing carboxylic acid and non-acid oxygenated bodies produced by the partial oxidation of petroleum hydrocarbons normally liquid or solid, and subsequently vulcanizing the composition.

12. The method of improving the resistance of vulcanized rubber compositions to mechanical fatigue, which comprises compounding with the rubber a composite amino reaction mixture resulting from the reaction of an amino substance with a reaction mixture containing carboxylic acid and non-acid oxygenated bodies produced by the partial oxidation of petroleum hydrocarbons normally liquid or solid, including a substantial amount of free-hydroxyl compounds, and subsequently vulcanizing the composition.

13. Vulcanizable rubber compositons having compounded therewith a composite amino reaction mixture resulting from the reaction of an amino substance with a reaction mixture containing carboxylic acid and non-acid oxygenated bodies produced by the partial oxidation of petroleum hydrocarbons normally liquid or solid.

14. Vulcanized rubber compositions produced by the process of claim 1.

15. Aqueous emulsions or dispersions of rubber containing a composite amino reaction mixture compatible therewith resulting from the reaction of an amino substance with a reaction mixture containing carboxylic acid and non-acid oxygenated bodies produced by the partial oxidation of petroleum hydrocarbons normally liquid or solid.

16. Rubber cement compositions containing a composite amino reaction mixture resulting from the reaction of an amino substance with a carboxylic acid-containing reaction mixture produced by the partial oxidation of petroleum hydrocarbons.

17. New aqueous compositions containing suspended solid constituents and also containing as stabilizing and suspending constituents a composite amino reaction mixture resulting from the reaction of an amino substance with a reaction mixture containing carboxylic acid and non-acid oxygenated bodies produced by the partial oxidation of petroleum hydrocarbons normally liquid or solid, said reaction mixture containing amino reaction products of a plurality of amino-reactive oxygen-containing constituents.

18. The method of improving impregnating compositions containing aqueous dispersions of solid impregnating ingredients which comprises thoroughly incorporating therewith a compatible composite amino reaction mixture resulting from the reaction of an amino substance with a reaction mixture containing carboxylic acid and non-acid oxygenated bodies produced by the partial oxidation of petroleum hydrocarbons normally liquid or solid.

19. The method of stabilizing emulsions which comprises adding to the base liquid a composite amino reaction mixture resulting from the reaction of an amino substance with a reaction mixture containing carboxylic acid and non-acid oxygenated bodies produced by the partial oxidation of petroleum hydrocarbons normally liquid or solid, said compositions containing substantial amounts of amino-condensation as well as of other amino reaction constituents.

EDWARD ALFRED VAN VALKENBURGH.